No. 767,353. Patented August 9, 1904.

UNITED STATES PATENT OFFICE.

MITFORD C. MASSIE, OF WASHINGTON, DISTRICT OF COLUMBIA, ADMINISTRATOR OF FRITZ ACH, DECEASED, ASSIGNOR TO C. F. BOEHRINGER & SOEHNE, OF MANNHEIM-WALDHOF, GERMANY, A FIRM.

ART OF MAKING XANTHIN.

SPECIFICATION forming part of Letters Patent No. 767,353, dated August 9, 1904.

Application filed January 6, 1903. Serial No. 138,063. (No specimens.)

*To all whom it may concern:*

Be it known that FRITZ ACH, deceased, late a citizen of Germany, and a resident of Mannheim, Germany, did invent new and useful Improvements in the Preparation of Xanthins; and I, MITFORD C. MASSIE, a citizen of the United States, and a resident of Washington, in the District of Columbia, the duly-constituted administrator of the estate of said FRITZ ACH, deceased, do hereby declare the following to be a full, clear, and exact description of the said invention of said decedent, such as will enable others skilled in the art to which it appertains to make and use the same.

This invention relates to the art of preparing xanthin, the object of the same being to add new starting materials to those already available for this purpose, and in particular such starting materials as will lead directly or indirectly to economy in the production of this member of the purin series.

The inventor found that thioxanthin may be converted into xanthin proper by adopting proper methods of oxidation. By the reactions which he devised for this purpose the sulfur atom is eliminated either as $SO_2$ or $H_2SO_4$, according to the selection of the oxidizing agent.

The present invention, therefore, in its broad aspects, consists in reacting on thioxanthin with desulfurizing agents, which agents in the present case are oxidizing reagents.

This invention, moreover, consists in such further methods and features as will appear from the specification and as will be pointed out in the claims annexed.

In order to furnish a full and sufficient disclosure of this invention, a number of examples embodying what is considered the preferred manner of practicing the invention will now be recited.

*Example No. 1.—Oxidizing thioxanthin in acid solution.*—Fifty parts, by weight, of thioxanthin are suspended in three hundred parts, by volume, of fuming hydrochloric acid, and to this mixture a solution of sixty parts, by weight, of solution of sodium nitrite ($NaNO_2$) in one hundred and ninety parts, by weight, of water, is gradually added during a period of three hours, the whole being kept at room temperature and stirred or agitated during this entire time. After this the stirring is continued for further two hours, and the whole is then diluted with an equal amount, by weight, of water, and then heated on the water-bath. Any unchanged thioxanthin remaining is left undissolved in this operation and is removed by filtration. The solution is concentrated by evaporation *in vacuo* until a strong separation or precipitation of xanthin-chlorid takes place. The separated xanthin-chlorid is then dissolved in alkali and from this alkaline solution free xanthin is precipitated by means of acetic acid.

*Example No. 2.—Oxidation of thioxanthin to xanthin in alkaline solution.*—Five parts, by weight, of thioxanthin are dissolved in one hundred and seventy parts, by weight, of water and thirty parts, by volume, of ten times normal carbonate-of-soda solution ($Na_2CO_3$) in the water. The same is then cooled, and this cooled clear solution has then added to it ten parts, by volume, of a thirty-per-cent. solution of hydrogen peroxid, (corresponding to somewhat over one molecule,) the solution being cooled during the entire time during which the peroxid solution is added. The whole is then allowed to stand for several hours and filtered, so as to separate the solution from a small quantity of a finely-granular precipitate, consisting of the sodium salt of the unchanged thioxanthin. The filtrate is then further treated by carefully adding to it dilute hydrochloric acid until it reacts weakly alkaline, at which stage an amorphous precipitate is thrown down in copious quantity, sulfurous acid escaping at the same time. If now the whole is boiled down after having added an excess of acetic acid, xanthin will be separated in granular form and may then be isolated and further purified by known methods.

*Example No. 3.— Oxidation of thioxanthin to xanthin in neutral solution.*—Five parts of thioxanthin, together with four hundred parts of water and thirteen parts of finely-pulverized peroxid of manganese, ($MnO_2$,) are boiled with the aid of the reflux-cooler. After boiling for about twelve hours the whole is made slightly alkaline while hot and then filtered. The filtrate is then acidulated with acetic acid, which causes the xanthin, mixed somewhat with thioxanthin, to be thrown down. The precipitate being separated from the mother-liquor, the thioxanthin is removed therefrom by boiling with dilute hydrochloric acid, which dissolves only the xanthin. From this solution the xanthin is obtained by the method described under Example No. 1.

From the above it will be noted that the reagents at starting may be either in solution or in suspension. This fact is expressed in the generic claims by the employment of the term "bath," which covers both.

While said FRITZ ACH in illustration of the invention, generically considered, has described methods of oxidizing thioxanthin in alkaline and neutral baths or solutions, such methods are not herein claimed specifically, since they are thus covered in divisional applications, Serial Nos. 189,047, (M',) and 189,048, (N',) respectively, filed January 14, 1903.

What is claimed, and desired to be secured by Letters Patent of the United States, is—

1. The process of preparing xanthins which consists in causing an oxidizing agent to act on a thioxanthin.

2. The process of preparing xanthin which consists in acting upon a bath containing thioxanthin with an oxidizing agent.

3. The process which consists in acting upon a solution of thioxanthin with an oxidizing agent.

4. The process which consists in acting upon an acid-bath of thioxanthin with sodium nitrite.

5. The process which consists in acting upon an acid-bath of thioxanthin with an aqueous solution of sodium nitrite.

6. The process which consists in acting upon an acid-bath of thioxanthin with an aqueous solution of sodium nitrite and then diluting with water, and heating.

7. The process which consists in suspending thioxanthin in fuming HCl in the proportions substantially as stated and stirring substantially at room temperature and then, after the lapse of some time, adding a solution of sodium nitrite in water in the proportion stated, and, finally, adding water in the proportion substantially stated and heating on the water-bath.

In testimony whereof I affix my signature in presence of two witnesses.

MITFORD C. MASSIE,
*Administrator of the estate of Fritz Ach, deceased.*

Witnesses:
L. T. GREIST,
ALBANUS S. T. JOHNSON.